United States Patent [19]

Inoue et al.

[11] 3,845,497

[45] Oct. 29, 1974

[54] COLOUR VIDEO SIGNAL RECORDING AND REPRODUCING SYSTEM AND APPARATUS

[75] Inventors: Yuzuru Inoue; Takashi Shinozaki, both of Tokyo, Japan

[73] Assignee: Victor Company of Japan, Ltd., Kanagawa-ken, Yokohama City, Japan

[22] Filed: Mar. 1, 1972

[21] Appl. No.: 230,911

[30] Foreign Application Priority Data

Mar. 4, 1971 Japan .............................. 46-11148

[52] U.S. Cl. .................................................. 358/8

[51] Int. Cl. .............................................. H04n 9/02

[58] Field of Search ........ 178/5.2 R, 5.4 R, 5.4 CD, 178/5.4 C; 360/67

[56] References Cited

UNITED STATES PATENTS 3,704,341 11/1972 Fujita .......................... 178/5.4 CD

*Primary Examiner*—Richard Murray

[57] ABSTRACT

In a color video signal recording and reproducing system and apparatus, a luminance signal derived from a color video signal is frequency modulated, a chrominance signal is frequency converted, and the resulting signals are superimposed and are recorded and reproduced. The reproduced frequency-modulated luminance signal is demodulated, the frequency converted chrominance signal is frequency converted to the original frequency, and the resulting signals are mixed to obtain a color video signals. The producing system in the above described system and apparatus is so adapted that an automatic phase control loop is operated, with respect to the frequency conversion means, for carry out the above mentioned latter frequency conversion at the time of normal reproduction. The oscillation output of a reference frequency oscillator is supplied to the frequency conversion means at the time of reproduction for dubbing recording.

5 Claims, 7 Drawing Figures

COLOUR VIDEO SIGNAL RECORDING AND REPRODUCING SYSTEM AND APPARATUS

BACKGROUND OF THE INVENTION

This invention relates to a color video signal recording and reproducing system and apparatus, and more particularly to a system and apparatus for recording color video signals and reproducing the same thus recorded in a manner to use a normal reproduction or a dubbing recording.

Generally, color video signal recording and reproducing systems are classified into (1) systems wherein the luminance signal and chrominance components are recorded and reproduced in separate tracks on the magnetic medium, and (2) systems wherein the color video signal is frequency modulated and recorded and reproduced. The first system has an essential disadvantage since it uses twice as much magnetic tape. The second system has a disadvantage when a simple type video tape recorder uses relatively low and narrow frequency band since beats are liable to be produced. These beats cause moires and degrade the quality of the reproduced pictures.

To overcome the problems resulting from a production of beats when the second system is used for color-TV broadcasting, a high band system is employed. The FM carrier wave has a frequency which is higher than in the frequency of the low band system.

However, relatively low speeds of the magnetic heads and the magnetic tape of a simple video tape recorder are generally in industrial application of color television. As a result pronounced beats are often caused by the FM carrier wave and chrominance subcarrier.

The following factors are responsible for the production of beats. (1) There is a leaking of the frequency modulated component through the frequency modulator. (2) There is a leaking of the frequency modulated component through the frequency demodulator. (3) There is a folded spectrum in the second side band with respect to the chrominance subcarrier. (4) There is a non-linear characteristic of the low carrier wave FM transmission system. Of these factors, the fourth factor is responsible for the beats inevitably produced during the process of operation of the magnetic tape. Thus, it is impossible to wholly eliminate the beats of this type. However, it is not impossible to eliminate the beats caused by the factors (1) to (3) since they result from the low carrier wave frequency modulation of video signals comprising carrier chrominance signals.

Further, an audio signal magnetic recording and reproducing apparatus generally uses a high frequency bias for recording the audio signals and, accordingly, has a comparatively good linear characteristic. In a conventional video tape recorder, however, video signals are directly recorded after being frequency modulated, without using the high frequency bias. The absence of the high frequency bias produces a distortion in wave form. The distortion in wave form are produced due to non-linearity of the magnetization curve (B-H curve) of the magnetic material coated on the magnetic tape. As is well known, the magnetization curve is symmetrical with respect to the origin point. Therefore, the distortion components also become symmetrical distortion components. As a result, the distortion components thus produced mostly include the third harmonic distortion components.

With the aim of overcoming the above described disadvantages, the applicants have previously proposed various systems, as described in the specifications of the copending United States Patent applications, Ser. No. 12,301, filed Feb. 18, 1970 entitled "COLOR VIDEO SIGNAL RECORDING AND REPRODUCING SYSTEM" and Ser. No. 88,350, filed Nov. 10, 1970, entitled "COLOR VIDEO SIGNAL RECORDING AND REPRODUCING SYSTEM." In these systems, a color video signal is divided into a low band luminance signal component and a high band chrominance signal component. The luminance signal component is frequency modulated. The chrominance signal component is frequency converted. The resulting frequency-modulated wave and frequency-converted direct wave are mixed, and then recorded and reproduced. In the reproduction system of this proposed system, the reproduced signal is divided into a frequency-modulated wave and a frequency-converted direct wave. The frequency-modulated wave is demodulated to produce a luminance signal. The frequency-converted wave is frequency converted and returned to the original frequency to produce a chrominance signal. Both of the resulting signals are mixed, thereby to obtain a reproduced color video signal.

For carrying out color processing, this reproduction system uses an automatic phase control (APC) loop including a closed loop comprising means for separating a burst signal from the output chrominance signal of the frequency converter, means for comparing the phases of the burst signal thus separated and a reference signal, and a voltage controlled oscillator operating at an oscillation frequency controlled by the phase error output of the phase comparing means to supply its output to the frequency converter.

However, timing errors may enter into means forming this APC loop such as the burst signal separating means, phase error detecting means, and means for holding the output of the phase error detection for one horizontal scanning period. If so, these timing errors cause other errors unrelated to the timing errors of the reproduced chrominance signal itself (i.e., phase variation of a chrominance subcarrier frequency of 3.58 MHz). In this case, the color stability of the reproduced picture is deteriorated to a great extent.

Furthermore, among the timing errors in the reproduced chrominance signal, particularly the high frequency component error undergoes a phase delay, at the phase error detection means and the holding means, since the phase error detection is being carried out at intervals of 63.5 $\mu$sec. (i.e., one horizontal scanning period). Accordingly, an APC loop cannot ordinarily afford an improvement with respect to timing errors of high band frequencies of from 2 to 3 KHz. On the contrary, the use of an APC loop has the adverse effect of increasing the timing errors. As a result, the degree of improvement of color stability inversely becomes a deterioration. These adverse phenomena are particularly pronounced during dubbing recording as described later.

SUMMARY OF THE INVENTION

It is an object of the present invention to provide a novel and useful color video signal recording and reproducing system and apparatus wherein timing errors due to the existence of an APC loop, particularly during reproduction for dubbing recording, do not become mixed with reproduced signals.

Another object of this invention is to provide a color video signal recording and reproducing system and apparatus having an organization such that an APC loop, used at the time of normal reproduction, is cut off or removed from the reproduction system at the time of reproduction, for dubbing recording. In accordance with the system and apparatus of this invention, there is no degrading of the color stability due to a mixing in of timing errors even when dubbing recording is repeated a great numbr of times.

A further object of this invention is to provide a color video signal recording and reproducing system and apparatus of an organization wherein, at the time of reproduction for dubbing recording, the output of a reference oscillator of the recording system of the system is used, instead of the output of a voltage controlled oscillator of the APC loop.

Further objects and features of this invention will become apparent from the following detailed description with respect to preferred embodiments of the invention, when read in conjunction with the accompanying drawings, in which like parts are designated by like reference numerals and characters.

DETAILED DESCRIPTION OF THE INVENTION

Figure 1:
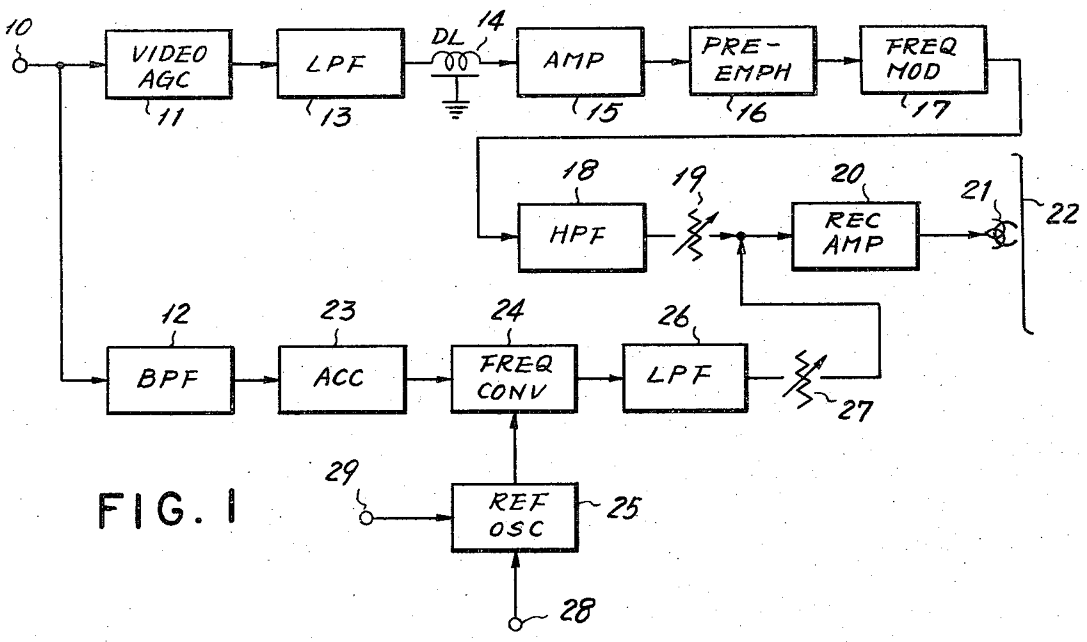
FIG. 1 is a block diagram showing one embodiment of a recording system of a color video signal recording and reproducing system or apparatus according to the invention.

In one embodiment of a recording system as illustrated in FIG. 1, an NTSC system color video signal is applied to an input terminal 10 and supplied to a video AGC circuit 11 and a band-pass filter 12. The output of the AGC circuit 11 is supplied to a low-pass filter 13, wherein a luminance signal component (3 MHz or less) is extracted therefrom. The luminance signal component thus filtered out is passed through a delay line 14 for time matching with a chrominance signal, as described hereinafter, and is then supplied to an amplifier 15. The luminance signal component thus amplified is passed through a preemphasis circuit 16 and then supplied to a frequency modulator 17, where it is frequency modulated. The luminance signal component thus frequency modulated is supplied to a high-pass filter 18, where frequency components of 1.2 MHz and less are removed, and is then passed through a recording level regulator 19 to a recording amplifier 20.

On the other hand, a chrominance signal having a frequency band of from 3 to 4.2 MHz is separated, in the band-pass filter 12 from the input color video signal. The separated signal is supplied through an automatic chroma control circuit 23 to a frequency converter 24. A reference frequency oscillation output is supplied from a 4.347 crystal oscillator 25 to the frequency converter 24, where the above mentioned chrominance signal is frequency converted to a low frequency band so as to have a chrominance subcarrier of a center frequency of 767 KHz. This oscillator 25 operates when it receives a voltage through a terminal 29 at the time of the recording mode and at the time of the reproduction mode for dubbing recording. This chrominance signal thus frequency converted is rid of superfluous high band components in a low-pass filter 26 and, passing through a recording level regulator 27, is mixed with the above mentioned frequency-modulated luminance signal, the resulting mixed signal being supplied to the recording amplifier 20.

The frequency-modulated luminance signal and the frequency-converted chrominance signal thus mixed and amplified by the recording amplifier are recorded by a recording magnetic head 21 on a magnetic tape 22. For this recording, a rotary magnetic head 21 is used for the magnetic head. Known means may be used wherein the recording is accomplished on the magnetic tape 22 along a track oblique to the longitudinal direction thereof. During this recording, a suitable multiple level of the carrier chrominance signal is of the order of − 20 dB.

Figure 2:
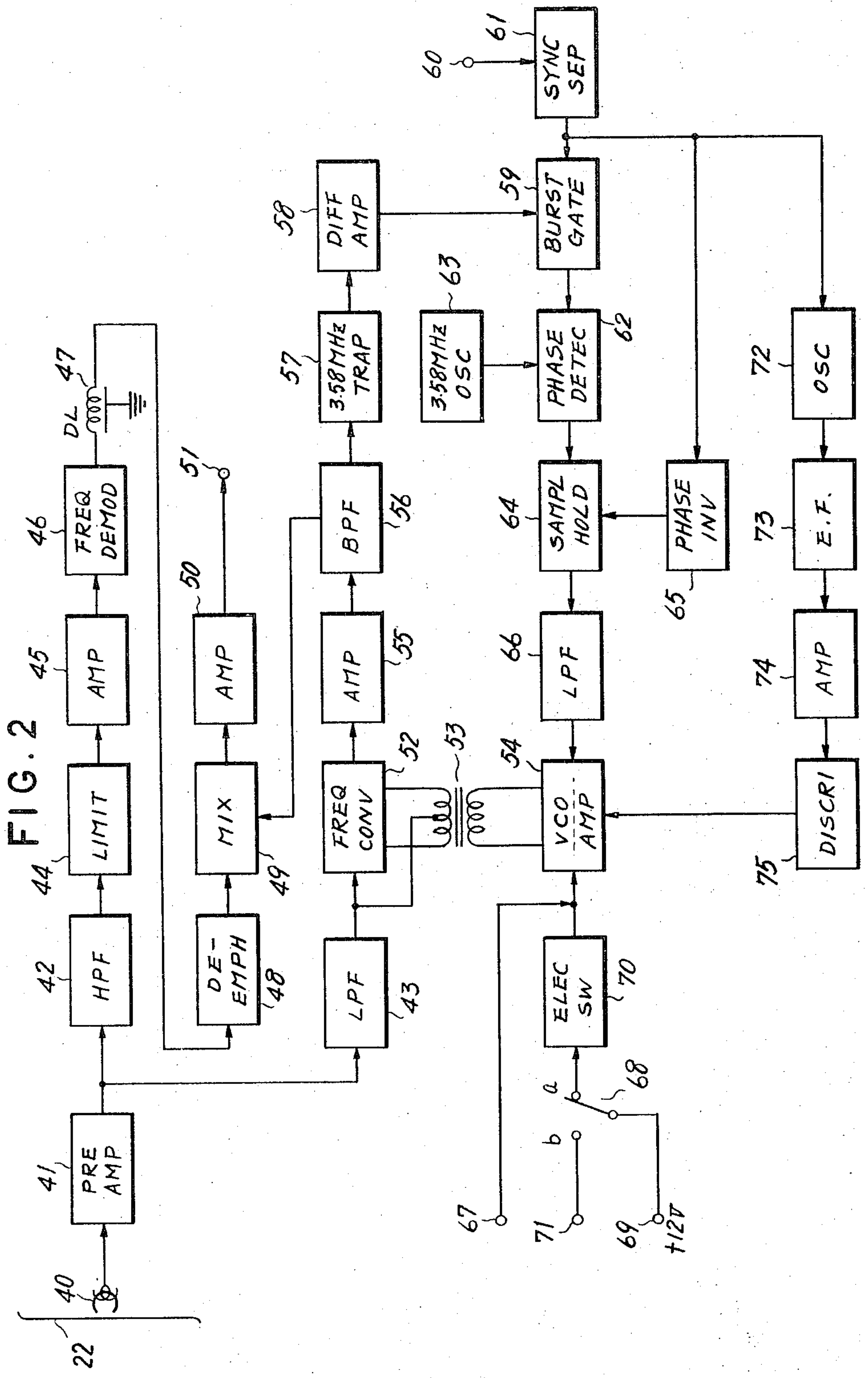
FIG. 2 is a block diagram showing one embodiment of a reproducing system of the system or apparatus according to the invention.

One embodiment of a reproduction system for reproducing the signal recorded in the above described manner is illustrated in FIG. 2. The signal reproduced by a reproducing magnetic head 40 from the magnetic tape 22 is amplified by a pre-amplifier 41. Then it is supplied to a high-pass filter 42 having a lower limit frequency of 1.2 MHz and a low-pass filter 43 having an upper limit frequency of 1.2 MHz. A frequency-modulated luminance signal is separated from the reproduced signal by the high-pass filter 42 and limited in amplitude by a limiter 44 and is then amplified by an mplifier 45, thereafter being supplied to a frequency demodulator 46. The luminance signal demodulated by the demodulator 46 is supplied, through a delay line 47 for time matching with a chrominance signal and then through a de-emphasis circuit 48, for accomplishing de-emphasis, to a mixer 49.

On the other hand, a chrominance signal converted to the low band is separated by the low-pass filter 43 and supplied to a balanced frequency converter 52. This converter 52 is supplied with a signal, for frequency conversion from a circuit represented by the block 54, the supply being by way of a balanced transformer 53. The circuit represented by the block 54 operates in the manner described hereinafter as a voltage controlled oscillator (VCO) or as an amplifier, in accordance with the mode of reproduction. The chrominance signal which has been frequency converted by the frequency converter 52 and restored to the original frequency band having a chrominance subcarrier frequency of 3.58 MHz. is amplified in an amplifier 55. After passing through a band-pass filter 56 having a pass band of from 3 to 4.2 MHz, it is supplied to the above mentioned mixer 49.

The mixer 49 mixes the demodulated luminance signal and the chrominance signal to produce a reproduced color video signal, which, after being amplifier by an amplifier 50, is led out through an output terminal 51.

On the other hand, the output chrominance signal of the band-pass filter 56 is ubjected to an improvement of a signal to noise ratio of a burst signal by a trap circuit 57 of 3.58 MHz. After a differential amplifier 58 removes noise due to amplitude fluctuation of the burst signal, the chrominance signal, is supplied to a burst gate circuit 59. A part of the reproduced color video signal led out through the terminal 51 is supplied through a terminal 60 to a synchronizing signal separating circuit 61. There, a synchronizing signal is separated and then supplied to the burst gate circuit 59, where the burst signal is separated from the signal from the amplifier 58.

The burst signal is supplied to a phase comparator 62, where it is subjected to a phase comparison with a signal of a frequency of 3.58 MHz from a 3.58 MHz crystal oscillator 63. The phase comparison error output of the phase comparator 62 is supplied to a succeeding sampling hold circuit 64, to which a synchronising signal is being supplied from the synchronizing signal separating circuit 61, by way of a phase inverter 65. The above mentioned phase comparison error output signal is held during every horizontal scanning period by the sampling hold circuit 64. The output signal of the sampling hold circuit 64 is passed through a low-pass filter 66 and then supplied to the circuit represented by the block 54.

The circuit represented by the block 54 operates as a voltage controlled oscillator (VCO), as described hereinafter, at the time of normal reproduction. The oscillation output of this oscillator 54 is supplied as a signal for frequency conversion to the frequency converter 52. The frequency converter 52, amplifier 55, band-pass filter 56, 3.58 MHz trap 57, differential amplifier 58, burst gate circuit 59, phase comparator 62, sampling hold circuit 64, low-pass filter 66, and voltage controlled oscillator 54 constitute an automatic phase control (APC) loop. The existence of this APC loop makes it possible to obtain a stable reproduced color video signal from the output terminal 51, at the time of normal reproduction. This output reproduced signal is supplied to the television receiver at the time of normal reproduction to accomplish picture reproduction. At the time of reproduction for dubbing recording, this input signal is dubbed in on a recording by a recordng magnetic head on a magnetic tape of another magnetic recording and reproducing apparatus.

However, since a band-pass filter 56 exists in this APC loop, a constant phase error or a phase change within a range of 3.58 MHz ±500 KHz occurs here. Furthermore, since the sampling hold circuit 64 has a time constant of a magnitude which holds a signal during one horizontal scanning period, a phase error occurs also in this circuit 64. In addition, a phase error occurs also in the low-pass filter 66, provided for the purpose of stabilizing the operation of the APC loop. Thus, a residual phase error is produced in the APC loop. The absolute value of this residual phase error may be represented by $K\ |m/fc|$, where: $fc$ is the loop gain; $m$ = GA/GD; GA is the AC gain within he loop; and GD is the DC gain within the loop.

At the time of normal reproduction, this residual phase error is of very small magnitude and does not become a problem. However, if dubbing recording is repeated with the APC loop in operation, this phase error will successively accumulate at each instance of dubbing recording.

In the APC loop, furthermore, the burst gate circuit 59 is provided. Accordingly, if there is a timing error between the luminance signal and the chrominance signal, the gating position of the burst signal will shift from its normal position. In this case also, a repetition of dubbing recording will cause an accumulation of the above described error, and the signal to noise ratio of the burst signal will decrease. Because of this lowering of the signal to noise ratio, the degree of improvement with respect to jitters is lowered. Furthermore, since the phase comparison sensitivity of the phase comparator drops because of timing errors, the gain of the APC loop becomes small, and the above described residual phase error increases.

Accordingly if the APC loop is operated also in the case where dubbing recording is carried out, there will be no improvement with respect to high-band jitter components from 2 to 3 KHz or higher, due to the APC loop. On the contrary, there will be a degradation in some cases. It has been found that, for this reason, it is preferable not to cause this APC loop to operate during dubbing recording.

Accordingly, in the system of this invention, the use of the APC loop is avoided at the time of dubbing recording by the following organization. A signal having a frequency of 4.347 MHz is supplied by the frequency converter 24 via the output terminal 28 in the recording system shown in FIG. 1 to the circuit represented by the block 54, by way of an input terminal 67 in the reproduction system shown in FIG. 2. A switch 68 is operated by a panel switch (not shown) having a moving contact connected to a stationary contact point *a* for normal reproduction and switched to a contact point *b* at the time of reproduction for dubbing recording. The moving contact of this switch 68 is connected to a terminal 69 of a +12V power supply. The contact point *a* is connected to an electronic switching circuit 70.

Since the moving contact of the switch 68 is connected to the contact point *a* at the time of normal reproduction, a voltage of +12V is applied on the electronic switching circuit 70 by way of the switch 68. At this time the electronic switching circuit 70 is so adapted that it grounds the line from the terminal 67 and is capable of operating the circuit represented by the block 54, as the voltage controlled oscillator. Thus, at the time of normal reproduction, the circuit of the block 54 operates as a voltage controlled oscillator, and moreover, the APC loop containing the voltage controlled oscillator 54 carries out the normal APC operation.

Then, when reproduction for dubbing recording is carried out, the moving contact of the switch 68 is switched and connected to the contact point *b* by operating the aforementiond panel switch (not shown) of the magnetic recording and reproducing apparatus. Consequently, the +12V voltage applied by way of the terminal 69 is applied on the oscillator 25 by way of the switch 68, terminal 71 connected to the contact point *b*, and terminal 29 (FIG. 1), whereupon the oscillator 25 generates a signal of a frequency of 4.347 MHz. The oscillation output of the oscillator 25 is supplied by way of the terminal 28 and the terminal 67 (FIG. 2) to the circuit represented by the block 54. At this time, no voltage is applied through the terminal 69 to the electronic switching circuit 70. Accordingly, the circuit of the block 54 operates merely as an amplifier. The output oscillation signal of the oscillator 25 supplied through the terminals 28 and 67 to the amplifier 54 is there amplified and supplied by way of the transformer 53 to the frequency converter 52. A frequency-converted chrominance signal supplied from the low-pass filter 43 to the frequency converter 52 is frequency converted by the stable frequency of 4.347 MHz from the crystal oscillator 25 and is restored to the original chrominance signal having a chrominance subcarrier of 3.58 MHz.

Accordingly, since the circuit represented by the block 54 does not operate as a voltage controlled oscillator constituting one block of the APC loop at the time of reproduction for dubbing recording, the APC loop becomes inoperative, whereby occurrence of the adverse phenomena resulting from the existence of an APC loop at the time of dubbing recording as described above is prevented.

Figure 3:
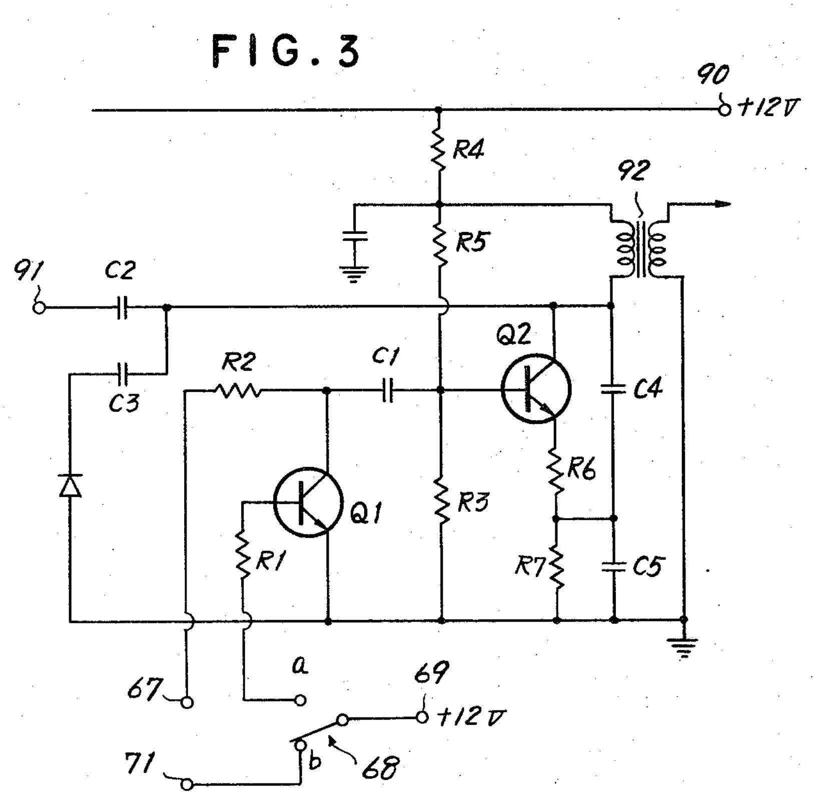
FIG. 3 is a circuit diagram of one embodiment of an electric circuit of an essential part of the system shown in FIG. 2.

One embodiment of specific electric circuit of the circuit of the block 54, the switch 68, and the electronic switching circuit is illustrated in FIG. 3. The base of a transistor $Q_1$ constituting the electronic switching circuit 70 is connected by way of a resistor $R_1$ to the contact point *a* of the switch 68. The emitter of this transistor $Q_1$ is grounded. The base of a transistor $Q_2$ constituting the circuit of the block 54 is connected by way of a capacitor $C_1$ and a resistor $R_2$ to the terminal 67. The collector of the transistor $Q_1$ is connected to the junction between the capacitor $C_1$ and the resistor $R_2$. Between the base of the transistor $Q_2$ and the ground, there is connected a resistor $R_3$, and between this base and a terminal 90 of a +12V power supply, there are connected resistors $R_4$ and $R_5$ in series. One end of the primary winding of a transformer 92 is connected to the junction between the resistors $R_4$ and $R_5$, while the other end is connected by way of the collector of the transistor $Q_2$ and a capacitor $C_2$ to a terminal 91, to which the output signal of the low-pass filter 66 is applied. The secondary winding of the transformer 92 produces an output signal, which is supplied to the balanced transformer 53.

Figure 4A:
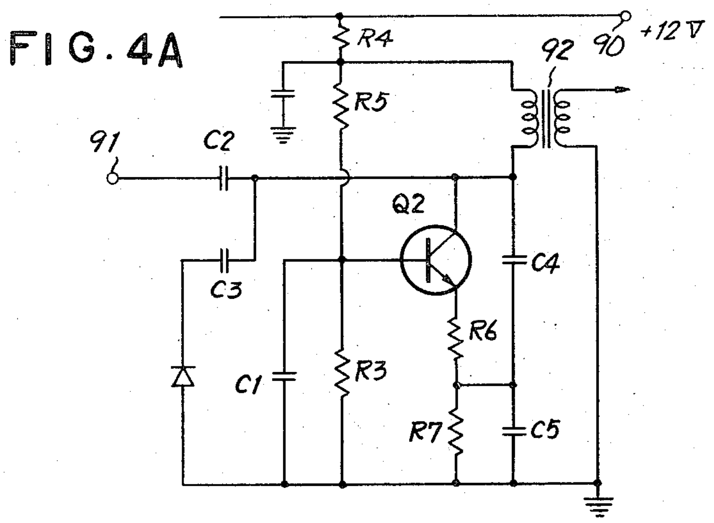
FIGS. 4A and 4B are equivalent circuit diagrams respectively indicating several operational states of the circuit shown in FIG. 3.

In the circuit of the above described construction, the moving contact of the switch 68 is connected to the contact point *a* of the time of normal reproduction, whereupon the voltage of +12V supplied through the terminal 69 is applied to the base of the transistor $Q_1$ through the switch 68 and resistor $R_1$, whereby the transistor $Q_1$ is rendered conductive. As a result, the junction between the capacitor $C_1$ and the resistor $R_2$ becomes grounded, and the circuit shown in FIG. 3 equivalently becomes a circuit as illustrated in FIG. 4A. In this circuit shown in FIG. 4A, the transistor Q2 operates as a grounded-base voltage controlled oscillator.

Figure 4B:
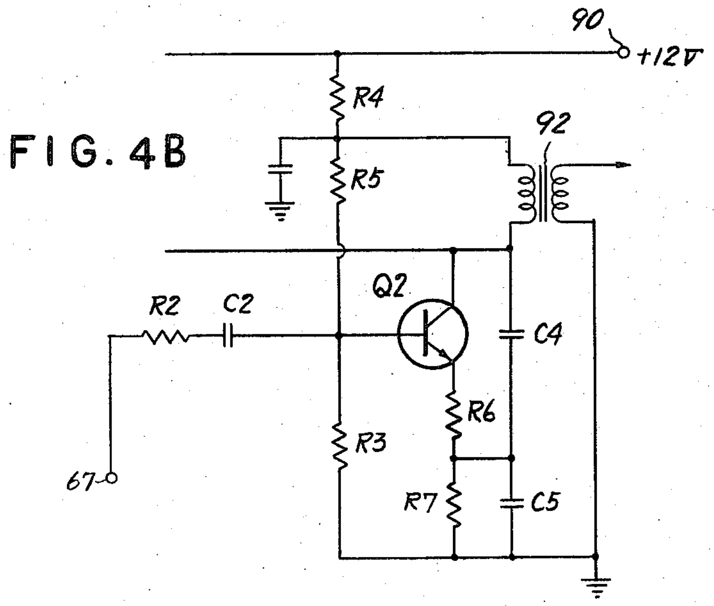

On the other hand, at the time of reproduction for dubbing recording, the moving contact of the switch 68 is placed in contact with the contact point *b*. Consequently, no voltage is applied to the base of the transistor $Q_1$, which thereby assumes its non-conductive state, and the junction between the capacitor $C_1$ and the resistor $R_2$ is opened from ground. For this reason, the circuit shown in FIG. 3 equivalently becomes a circuit as shown in FIG. 4B. An output oscillation signal of the crystal oscillator 25 introduced by way of the resistor $R_2$ and the capacitor $C_1$ through the terminal 67 is applied to the base of the transistor $Q_2$, which thereupon operates as an emitter-grounded amplifier to amplify the oscillation signal.

In the reproduction system as shown in FIG. 2, the following AFC loop is used to prevent the APC from being drawn into a false stable point responsive to the fluctuation of the traveling speed of the magnetic tape 22. A synchronizing signal from synchronizing signal separation circuit 61 is applied to an oscillator 72 to drive the same and cause it to generate a sinusoidal wave of the same frequency as this synchronizing signal. The oscillation output of this oscillator 72 is supplied by way of an emitter follower circuit 73 and an amplifier 74 to a discriminator 75. The sinusoidal wave passes through a resonant circuit of the discriminator 75 and is subjected to an envelope detection. The resulting output of the discriminator 75 is rectified, and the error output drives a varicap diode thereby to correct the oscillation frequency of the voltage controlled oscillator 54.

The burst signal is discontinuous every one horizontal scanning period, and it undergoes a phase comparison in each one horizontal scanning period. For this reason, even if there is a difference of 1Hz or an integral number of Hz in the 3.58 MHz in one horizontal scanning period, there will be no change in the error thereof. Accordingly, if the frequency of the reproduced chrominance signal deviates in correspondence with an error in the traveling speed of the magnetic tape, a false stable point will occur in one Hz or an integral number of Hz on the positive side or the negative side relative to the center frequency of 3.58 MHz. However, the above described AFC loop functions to correct the errors in the tape traveling speed, and the APC loop is always locked at a stable point of 3.58 MHz.

Since the APC loop is disconnected during the dubbing recording in the above described embodiment, color stabilization is not attained, and the color of the reproduced picture does not become stable on a monitor reproduced picture screen. However, by normally reproducing a magnetic tape which has been subjected to dubbing recording, an excellent color reproduced picture of stabilized colors can be obtained.

Figure 5:
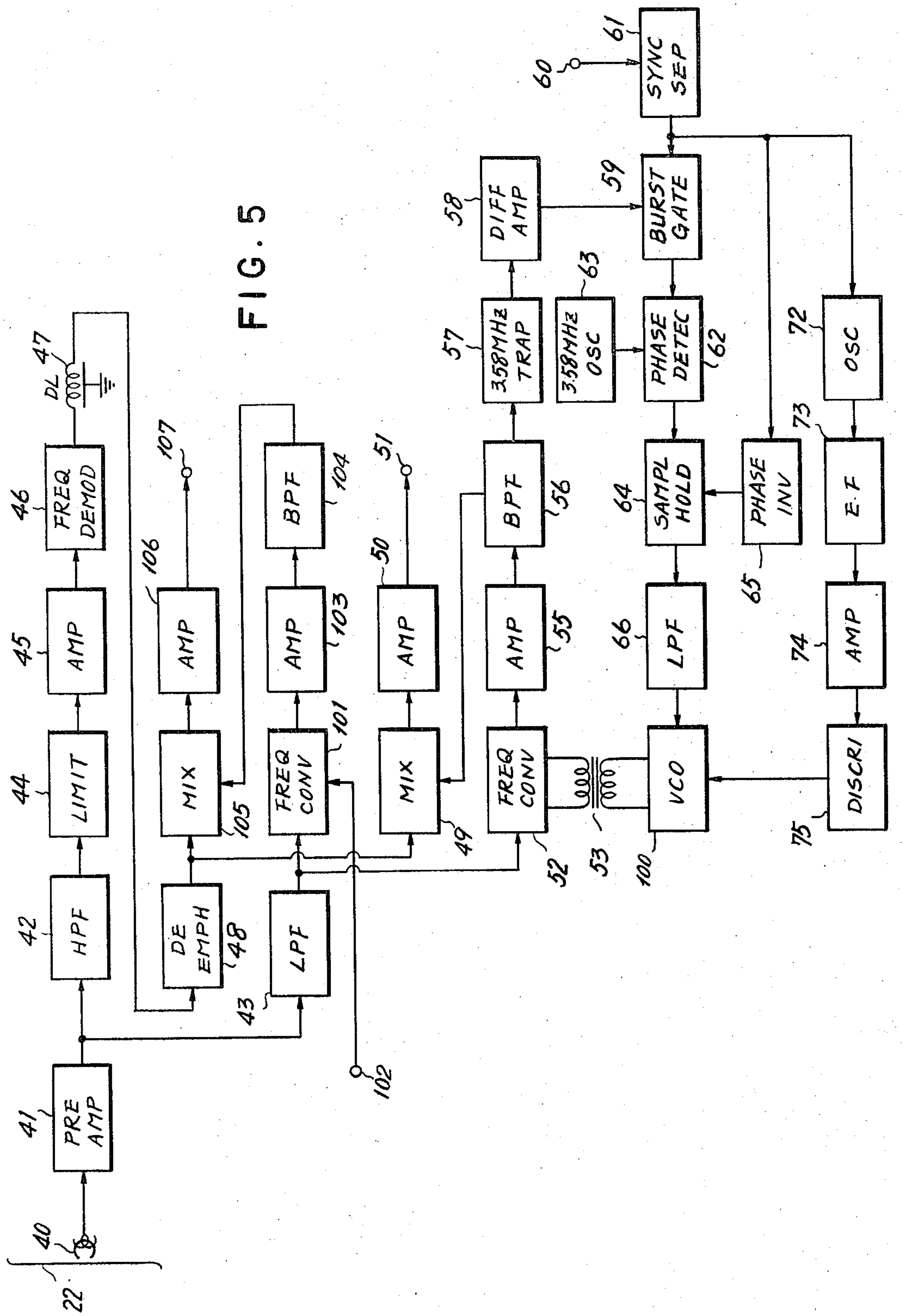
FIG. 5 is a block diagram showing another embodiment of the reproducing system.

Another embodiment of the reproducing system according to the invention is illustrated by block diagram in FIG. 5, in which parts which are the same as or similar to thsoe shown in FIG. 2 are designated by the same reference numerals and characters, and repeated description with respect to these parts already described hereinbefore will be omitted.

The reproducing system of this embodiment comprises a system having an APC loop and a system which does not have an APC loop. The former part, having an APC loop, is substantially the same as the APC loop illustrated in FIG. 2. It has a voltage controlled oscillator 100, which corresponds to the circuit of the block 54. The electronic switching circuit 70 in FIG. 2 is not used in he instant embodiment of FIG. 5. In the latter system having no APC loop, the output chrominance signal of the low-pass filter 43 supplied to a frequency converter 101 is frequency converted by a signal supplied from the crystal oscillator 25 by way of a terminal 102 and the terminal 28 (FIG. 1). The chrominance signal, which has been frequency converted in the original band, is supplied through an amplifier 103 and a band-pass filter 104 to a mixer 105. On the other hand, a demodulated luminance signal from the de-emphasis circuit 48 is supplied to the mixer 105 and is mixed with the above mentioned chrominance signal. The resulting output of the mixer 105, which is a reproduced color video signal, is amplified by an amplifier 106 and then led out through an output terminal 107.

At the time of normal reproduction, only the reproduced color video signal obtained as output from the output terminal 51 of the system having the APC loop is used. On the other hand, at the time of reproduction for dubbing recording, the reproduced color video signal obtained as output from the output terminal 107 of the system having no APC loop is introduced as a signal for dubbing recording to the magnetic head. The reproduced color video signal obtained as output from the output terminal 51 of the system having the APC loop is introduced into the monitor television receiver. As a result, at the time of reproduction for dubbing recording, it is possible to accomplish excellent dubbing recording without an accumulation of errors, such as phase error and timing error similarly as described with reference to FIG. 2. Moreover, it is possible to obtain, on the picture screen of the monitor television receiver, an excellent reproduced color picture for monitor which has been subjected to color stabilization by the APC loop.

Figure 6:
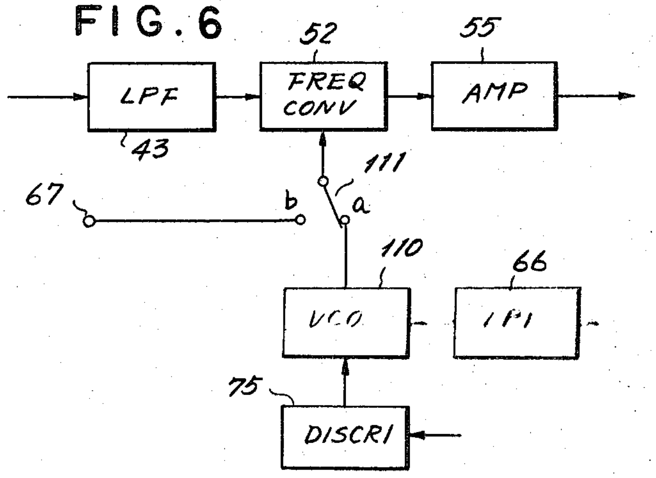
FIG. 6 is a block diagram showing the essential parts of still another embodiment of the reproducing system.

In still another embodiment of this invention as illustrated in FIg. 6, a voltage controlled oscillator 110 is used instead of the circuit of the block 54 shown in FIG. 2, and as a switch 111 is provide in place of the transformer 53. The moving contact of this switch 111 is connected to the frequency converter 52, while the contact points *a* and *b* are respectively connected to the voltage controlled oscillator 110 and the terminal 67. Furthermore, the moving contact of the switch is operated with a panel switch (not shown) and is placed in contact with the contact point *a* at the time of normal reproduction and with the contact point *b* at the time of reproduction for dubbing recording.

Further, this invention is not limited to these embodiments but various variations and modifications may be made without departing from the scope and spirit of the invention.

What we claim is:

1. A color video signal recording and reproducing system which comprises:

a first filter means for separating a luminance signal from the color video signal;

means for frequency modulating the separated luminance signal;

a second filter means for separating a chrominance signal from the color video signal;

a first frequency converting means for frequency converting the separated chrominance signal to a low frequency band;

means for mixing the output of the frequency modulating means and the output of the first frequency converting means;

means for recording the mixed signal on a recording medium and reproducing the same;

a third filter means for separating the frequency modulated luminance signal from the signal reproduced by the recording and reproducing means;

means for frequency demodulating the frequency modulated luminance signal thus separated;

a fourth filter means for separating the frequency converted chrominance signal from the reproduced signal;

a second frequency converting means for restoring the frequency converted chrominance signal thus filtered to the original frequency band;

an automatic phase control loop including means for separating a color burst signal from the output signal of the second frequency converting means, source means for generating a reference subcarrier frequency signal, means for comparing the phases in the output of the source means and the color burst signal, nd a voltage controlled oscillator means having an oscillation center frequency controlled by the output of the phase comparing means, said voltage controlled oscillator means supplying its output signal to the second frequency converting means;

means for mixing the frequency demodulated luminance signal and the output chrominance signal of the second frequency converting means for obtaining the reproduced color video signal;

means for supplying a reference signal for frequency conversion to the second frequency converting means;

switch means operable between positions for a normal reproduction mode and for another reproduction mode for dubbing recording thereby to switch an applied voltage;

electronic switching circuit means for performing an electronic switching operation corresponding to the switching of the applied voltage responsive to the switching operation of the switch; and means whereby said voltage controlled oscillator means operates as either a voltage controlled oscillator or an amplifier corresponding to the switching operation of the electronic switching circuit means, and means whereby said voltage controlled oscillator means operates as a voltage controlled oscillator responsive to the output of the phase comparing means during the normal reproduction mode and operates as an amplifier when supplied with the reference signal for frequency conversion during the other reproduction mode for dubbing recording.

2. The color video signal recording and reproducing system as defined in claim 1 in which said voltage controlled oscillator means comprises a first transistor having a base connected to the supplying means for supplying the reference signal for frequency conversion and having a collector connected to the phase comparing means, and a second transistor connected between the base of the first transistor and ground, the base of said second transistor being connected to the switch, and means whereby said first transistor operates as a voltage controlled oscillator during the normal reproduction with a result that the base of the first transistor is supplied with a voltage through the switch and the first transistor is made conductive and operates as the amplifier at the reproduction for dubbing recording when the base of the second transistor is not supplied with the voltage and the second transistor is switched to a non-conductive state.

3. A color video signal recording and reproducing apparatus comprising means for recording a video signal having a frequency modulated luminance signal mixed with a frequency converted chrominance signal, means for reproducing said recorded signal in either of two modes, phase loop control means including an electronic circuit, and means for selectively operating said electronic circuit as either an amplifier or a voltage controlled oscillator selectively responsive to signals indicating either of said two reproducing modes.

4. The color video signal recorder of claim 3 and means wherein said electronic circuit operates as said voltage controlled oscillator during normal reproduction or as an amplifier during reproduction for making a dubbing recording.

5. A color video signal recording and reproducing system which comprises:

means for recording a video signal having a frequency modulated luminance signal mixed with a frequency converted chrominance signal;

means for reproducing said recorded signal in either of two modes;

means for frequency reconverting the frequency converted chrominance signal of said reproduced signal to the original frequency band;

means for separating a color burst signal from the output signal of said frequency reconverting means;

source means for generating a reference subcarrier frequency signal;

means for comparing the phases in the output of the source means and the color burst signal;

electronic circuit means for supplying an output signal to the frequency reconverting means, said electronic circuit means operating as either a voltage controlled oscillator having an oscillation center frequency controlled by the output of the phase comparing means or as an amplifier for amplifying a reference signal for frequency conversion;

switch means operable between a first position for a normal reproduction mode and a second position for another reproduction mode to switch an applied voltage for making a dubbing recording;

electronic switching means responsive to the operation of the switch means for performing an electronic operation corresponding to the switching of the applied voltage; and means responsive to the switching operation of the electronic switching means for causing said electronic circuit means to operate as a voltage controlled oscillator during the normal reproduction mode and operate as an amplifier during the other reproduction mode for dubbing a recording.

* * * * *